(No Model.)

C. F. PIKE.
CLEANSING AND DISINFECTING WATER CLOSET BOWLS AND THEIR TRAPS.

No. 271,357. Patented Jan. 30, 1883.

WITNESSES:
Albert Lupton
William McCombs

INVENTOR
Charles F. Pike

UNITED STATES PATENT OFFICE.

CHARLES F. PIKE, OF PHILADELPHIA, PENNSYLVANIA, ASSIGNOR, BY MESNE ASSIGNMENTS, TO THE NATIONAL ANTI-SEWER GAS COMPANY, OF CAMDEN, NEW JERSEY.

CLEANSING AND DISINFECTING WATER-CLOSET BOWLS AND THEIR TRAPS.

SPECIFICATION forming part of Letters Patent No. 271,357, dated January 30, 1883.

Application filed July 11, 1881. Renewed September 23, 1882. (No model.)

*To all whom it may concern:*

Be it known that I, CHARLES F. PIKE, a citizen of the United States, and a resident of the city of Philadelphia, in the county of Philadelphia and State of Pennsylvania, have invented certain new and useful Improvements in Cleansing and Disinfecting Water-Closet Bowls and their Traps, of which the following is a specification, reference being had to the accompanying drawings, wherein—

Figure 1:
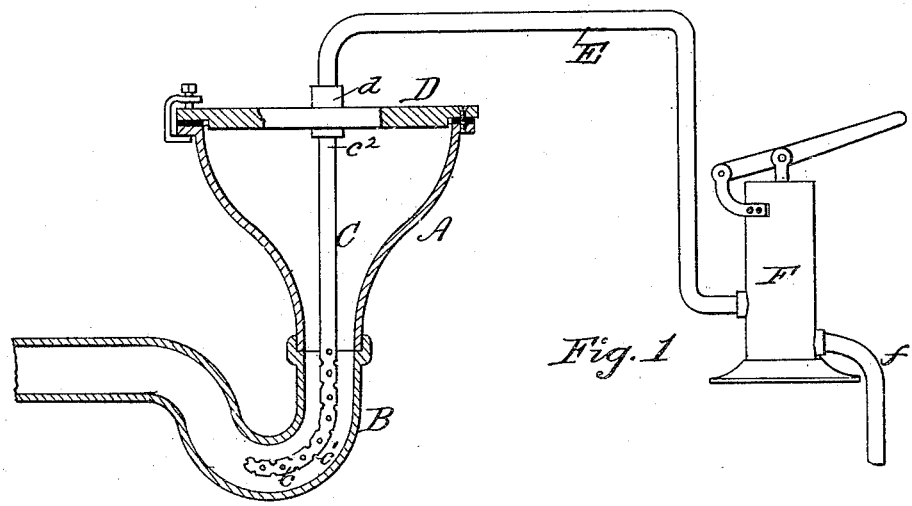
Figures 2, 3:
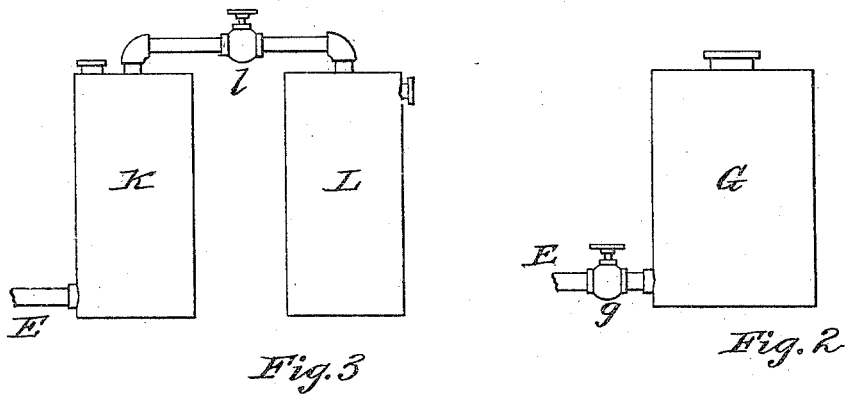

Figure 1 is an elevation, partly in section, of suitable form of apparatus for practicing my invention; and Figs. 2 and 3 are elevations of modifications of the pumping or pressure-obtaining devices.

My invention has relation to the removal of the fecal matter adhering to the walls of water-closet traps, and has for its object to effect such removal by the impact of a series of jets of water or other liquid introduced under pressure into the trap.

It is well known that the traps of water-closets gradually become coated with fecal deposits, which adhere thereto with great tenacity, and which eventually increase or accumulate to such extent that the trap becomes choked up, or its passage-way is reduced to such small bore that nothing but fluid matter will pass therethrough, thereby rendering the trap unfit for use. When in such condition it has heretofore been burned out to effect the removal of such foreign matter—an operation requiring time and necessitating the displacement of the closet-bowl, trap, and appurtenances. In many cases instead of burning out the trap it is thrown away and replaced by a new one. With my invention the water or fluid is conducted under pressure into the trap, and is then divided into numerous jets, which strike with great force against the walls of said trap. The impact of the jets loosens any fecal or foreign matter adhering to the walls of the trap, removes it therefrom, and washes it out of the trap into the soil-pipe. The trap is thereby completely and thoroughly cleansed without removing it from its position or displacing the parts of the water-closet.

My invention accordingly consists of the provision of a perforated tube adapted to enter and conform to the shape of the trap, a water or fluid supply, and means for forcing such fluid through the perforations in said pipe, whereby it is divided into a number of jets and caused to strike the walls of the trap with considerable force.

My invention further consists of the novel combination, construction, and arrangement of parts, as hereinafter more specifically described and claimed.

Referring to the accompanying drawings, A represents a water-closet bowl, and B the trap thereof.

C indicates a metal or other pipe, whose end $c$ is bent or adapted to conform to the shape of the trap, or to approximate thereto. Such pipe is provided with numerous perforations, as illustrated at $c'$, and its end $c^2$ is screwed, or otherwise attached to a union, $d$, on cap or cover D, which, when used, is secured to the top of the bowl or hopper A by means of clamps, as shown, or any other suitable fastening appliances may be employed. I however prefer to use said cap at all times, as it prevents splashing of the water from the bowl; but as it may be dispensed with without departing from my invention I do not limit myself to its use.

To the union $d$ or pipe C is attached a pipe, E, which is connected with a force-pump, as shown at F. The latter is provided with a hose or tube, $f$, leading to a hydrant or other water-supply.

The operation is simple and quite obvious. The apparatus, consisting of the perforated pipe, pump, and fixtures, is carried by the workman to the house or building wherein is located the water-closet and trap designed to be cleansed and disinfected. The pipe C is then inserted into the trap, substantially as shown in Fig. 1. The cover or cap D is then adjusted in position on the bowl and the pipe E secured to union $d$. The hose or tube of the pump being connected to the water-supply, said pump is operated, whereupon water is forced under pressure through pipe C, and emerges therefrom through perforations $c'$ in the form of jets, which strike with great force against the adhering matter on the walls of the trap. Such matter is thereby soon loosened and removed from said walls and washed out of the trap into the soil-pipe. When the trap is effectually cleansed connection between the pump and water-supply is severed and the pump connected to a reservoir containing disinfectant liquid or powder and operated as before, whereupon such disinfectant is forced through pipe C and into the trap to disinfect the latter. Hence said apparatus serves to inject both the water and the disinfectant into the trap. When the latter is completely cleansed and deodorized, the cover D is removed and the pipe C withdrawn from the trap, whereupon the closet is again ready for use, having been cleansed without taking it apart. Instead of attaching pipe E directly to pump F, it may be secured to a reservoir, G, containing water or a cleansing-fluid, and the latter connected to the pump, the pipe E being provided with a valve, $g$, as indicated in Fig. 2. The advantage of using the reservoir G is that a more steady pressure can be obtained for the water in said reservoir, the latter serving also as a container to permit any desired compression of air therein commensurate with its strength, the variation of the degree of force or compression of air in reservoir G being especially desirable in order to provide the requisite power for cleansing different traps wherein the fecal matter adheres thereto with varying tenacity. In cleansing S-traps a gum pipe or lead tube may be employed in lieu of pipe C, as described.

If desired, the portable pump F may be dispensed with and a power or driven pump substituted to produce the requisite air-pressure in reservoir G, in which case two reservoirs may be employed, one of which is charged or filled with compressed air at the factory or headquarters before starting out and the other is filled with water or disinfectant previous to commencing cleansing operations. Such construction of reservoirs is shown in Fig. 3, wherein K and L indicate such fixtures connected by a pipe having a cock, $l$. So, too, both portable and power pumps may be dispensed with, and in lieu thereof effervescing compounds may be placed in reservoir L to produce the air-pressure.

It will be noticed that the above-described devices for cleansing the closet-trap do not form a part of the closet, but are designed to be portable, and are secured to the closet only when it is to be cleansed.

I am aware that water-closets have been provided with devices for introducing jets or small streams of water into the bowl and trap for flushing the same after each use of the closet. I do not therefore wish to be understood as claiming such devices or mode of operation, as my invention has no reference whatever to the flushing of the bowl or trap, such flush being merely used to effect a removal from the trap of the loose fecal deposits floating in the water contained therein.

What I claim as my invention is—

1. In cleansing water-closet traps, the method of removing their fecal incrustations without displacing the fixtures of the closet, which consists of passing a flexible perforated tube through the bowl into the trap, then connecting such tube to a fluid-supply and then applying power thereto to force such fluid through and from said tube in a series of jets, so that their impact will loosen and remove such adhering fecal matter and wash it out of the trap, as specified.

2. In an apparatus for cleansing and disinfecting water-closet traps, the combination of a hose or tube having its end bent or adapted to conform to the shape of the trap to be cleansed, and provided with perforations throughout such bent portion, and a pump provided with a pipe or hose adapted and designed to be connected with a hydrant or other source of water-supply, substantially as shown and described.

3. In an apparatus for cleansing and disinfecting water-closets, the combination of pipe C, having a perforated end adapted to conform to the outline of the trap, a cap or cover, D, and pumping or pressure-producing mechanism, substantially as shown and described.

4. In a portable apparatus for cleansing and disinfecting water-closet traps, the combination of the following elements: a tube having a perforated end, a liquid-containing vessel, pipe-connection between said tube and vessel, and pumping or pressure-producing media, substantially as shown and described.

In testimony that I claim the foregoing I have hereunto set my hand this 27th day of June, A. D. 1881.

CHAS. F. PIKE.

Witnesses:
ALBERT LUPTON,
WILLIAM McCOMBS.